United States Patent [19]

Lew

[11] 4,450,732
[45] May 29, 1984

[54] DEVICE FOR IMPOSING THE LINEAR AND ANGULAR MOVEMENT TO THE VALVE STEM

[76] Inventor: Hyok S. Lew, 7890 Oak St., Arvada, Colo. 80005

[21] Appl. No.: 417,484

[22] Filed: Aug. 31, 1982

[51] Int. Cl.³ .............................................. G05G 7/00
[52] U.S. Cl. ........................................ 74/107; 74/491; 251/162; 251/163
[58] Field of Search ............... 251/296, 163, 162, 160, 251/251, 258; 74/107, 104, 491

[56] References Cited

U.S. PATENT DOCUMENTS 2,071,814  2/1937  Brisbane ............................... 251/162
3,469,461  9/1969  Ludwig .................................. 74/107

Primary Examiner—Alan Cohan
Assistant Examiner—Sheri Novack

[57] ABSTRACT

This invention relates to the device for imposing a linear movement to the valve stem of the free-disc butterfly valves or the free-ball-plug valves in one direction before imposing a rotating movement to open the valve and another linear movement to the valve stem in the other direction after imposing another rotating movement to close the valve.

1 Claim, 5 Drawing Figures

DEVICE FOR IMPOSING THE LINEAR AND ANGULAR MOVEMENT TO THE VALVE STEM

In the free-disc butterfly valves and free-ball-plug valves, a small amount of an axial movement of the valve stem in one direction presses the valve disc or the ball-plug onto the valve seat for the sure closure and another small amount of an axial movement of the valve stem in the other direction floats the valve disc or the ball-plug away from the valve seat for an easy rotation of the valve stem in opening and closing the valves. Therefore, the valve stem of a free-disc butterfly valve or a free-ball-plug valve must be equiped with a handle capable of imposing a small amount of the axial movement to the valve stem in one direction before rotating the valve stem to open the valve and another small amount of the axial movement to the valve stem in the other direction after rotating the valve stem to close the valve, which axial movements have to be imposed against the axial thrust force exerted on the valve stem by the fluid pressure acting on the valve disc or the ball plug to which the valve stem is connected mechanically or rigidly, which axial thrust force on the valve stem can be very large for the high pressure valves or the valves of large port size. Consequently, it requires a new invention to provide a compact and yet powerful device that is capable of imposing the linear and angular movement to the valve stem against a large resisting force in certain applications.

The primary object of the present invention is to provide the lever-action handle connected to one extremity of the rotatable elongated member wherein a flip of said handle in either direction about an axis substantially perpendicular to the axis of said rotatable elongated member imposes an axial movement to said rotatable elongated member in either direction in a powerful manner, while the pivoting movement of said handle in either direction about the axis of said rotatable elongated member rotates said rotatable elongated member in either direction.

Another object of the present invention is to provide the handle assembly for the free-disc butterfly valves or the free-ball-plug valves that is powerful enough to impose the linear and angular movement to the valve stem of said valves against the resistance created by the fluid pressure acting on the valve disc or the ball-plug to which the valve stem is mechanically or rigidly connected.

A further object of the present invention is to provide the handle assembly for the free-disc butterfly valves and the free-ball-plug valves, which is compact and inexpensive to manufacture.

These and other objects of the present invention will become clear as the description of the present invention proceeds. The present invention may be described with a great clarity and specificity by referring to the following Figures.

Figure 1:
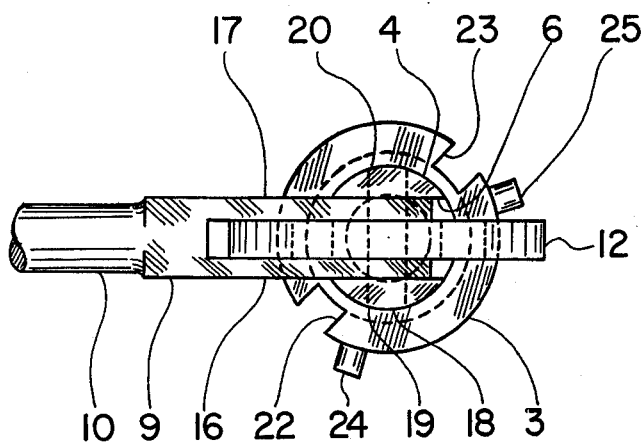
FIG. 1 illustrates the plan view of an embodiment of the present invention.
Figure 2:
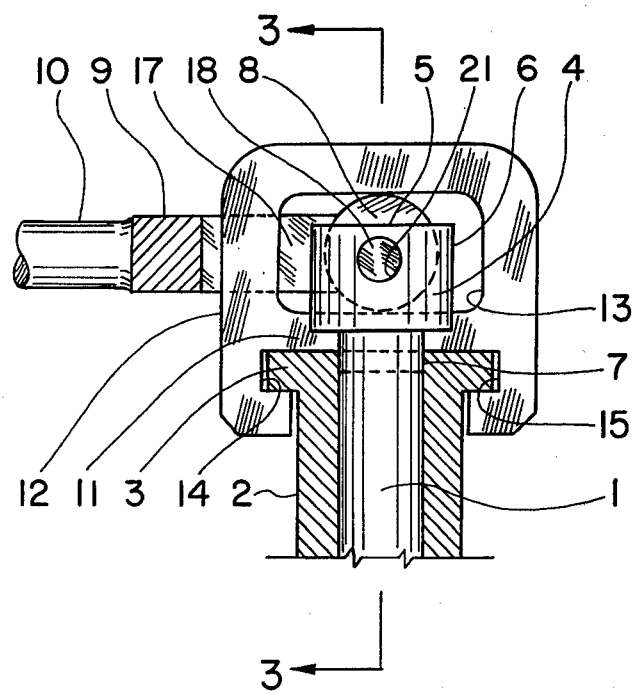
FIG. 2 illustrates an elevation view of the embodiment of the present invention shown in FIG. 1.

In FIGS. 1 and 2, there is shown a plan view and an elevation view of an embodiment of the present invention comprising the valve stem 1 rotatably engaging and extending through the stem-housing 2 rigidly connected to the valve body of a free-disc butterfly valve or free-ball-plug valve, which stem housing includes a flange 3 disposed at the extremity of said stem-housing. The outer extremity 4 of the valve stem 1 is enlarged in the diameter and includes a slitted-opening 5 disposed parallel to the central axis of the valve stem 1. The open end portion 6 of the slitted-opening 5 has an width large enough to rotatably receive the combination of a cam roller 8 rigidly sandwiched between two forked ends 16 and 17 of the tuning fork-like extremity 9 of the handle 10. The closed end portion 7 of the slitted opening 5 has a narrower width that is just wide enough to receive the rib 11 of the yoke 12 with an window 13 in a sliding relationship, which yoke 12 is rotatably anchored to the stem-housing 2 by means of the pair of notches 14 and 15 engaging the flange 3 included in the stem-housing 2. The yoke 12 is disposed intermediate two forked extremities 16 and 17 of the tuning fork-like extremity 9 of the handle 10, while the cam roller 8 is rigidly sandwiched between said two forked extremities 16 and 17. The combination of the cam roller 8 and two forked extremities 16 and 17 of the tuning fork-like extremity 9 of the handle 10 is rotatably connected to the outer extremity 4 of the valve stem 1 by means of the pin 18 engaging a pair of the holes 19 and 20 included in the outer extremity 4 of the valve stem 1, which pin 18 engages and extends through the eccentrically disposed hole 21 through the cam roller 8. The cam roller 8 is rotatably confined in the window 13 included in the yoke 12. A pair of the cut-outs 22 and 23 are included in the flange 3 of the stem-housing 2 to provide an access for the yoke 12 rotatably engaging the flange 3. The pair of the removable stops 24 and 25 are affixed to the flange 3 to provide the stops limiting the rotating movement of the valve stem 1 to the desired range. It should be understood that, when the valve stem 1 is removable from the stem-housing 2 in the direction opposite to the yoke 12 in which case the outer extremity 4 of the valve stem 1 must have the same diameter as the rest of the valve stem, the yoke 12 can be made to enagage the flange 3 by slipping in from the side of the stem-housing 2 after which step the valve stem 1 can be assembled to the stem-housing 2. Consequently, the pair of the cut-outs 22 and 23 included in the flange 3 of the stem-housing 2 are not required in said arrangement.

Figure 3:
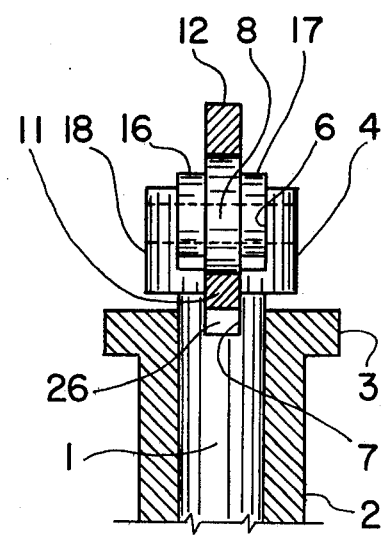
FIG. 3 illustrates a cross section of the embodiment of the present invention illustrated in FIGS. 1 and 2, which cross section is taken along a plane 3—3 as shown in FIG. 2.

In FIG. 3, there is illustrated a cross section of the embodiment shown in FIGS. 1 and 2, which cross section is taken along a plane 3—3 as shown in FIG. 2. It should be noticed that there is a significant clearance 26 between the rib 11 of the yoke 12 and the bottom of the slitted-opening 5, which is to provide a room for a small amount of the relative movement between the valve stem 1 and the yoke 12 in the direction parallel to the central axis of the valve stem 1.

With the construction of the device for imposing the linear and angular movement to the valve stem as shown in FIGS. 1, 2 and 3, said device operates in the following principle: When the handle 10 is positioned as shown in FIG. 2, the valve stem 1 is lowered into the valve body to the maximum. When the handle 10 is flipped over 180 degrees about the axis of the pin 18 from the position shown in FIG. 2 to the diametrically opposite position, the valve stem 1 is pulled to the maximum out of the valve body. The degree of the axial movement of the valve stem 1 is determined by the degree of the eccentricity of the location of the hole 21 included in the cam roller 8. Flipping of the handle 10 back to the position shown in FIG. 2 lowers the valve stem back to the lowest position. The pivoting movement of the handle 10 about the central axis of the valve stem 1 rotates the valve stem 1 about its central axis. The generic term "rotatable elongated member" will be used in place of the valve stem and the generic term "stationary housing" will be used in place of the stem-housing hereafter.

Figures 4, 5:
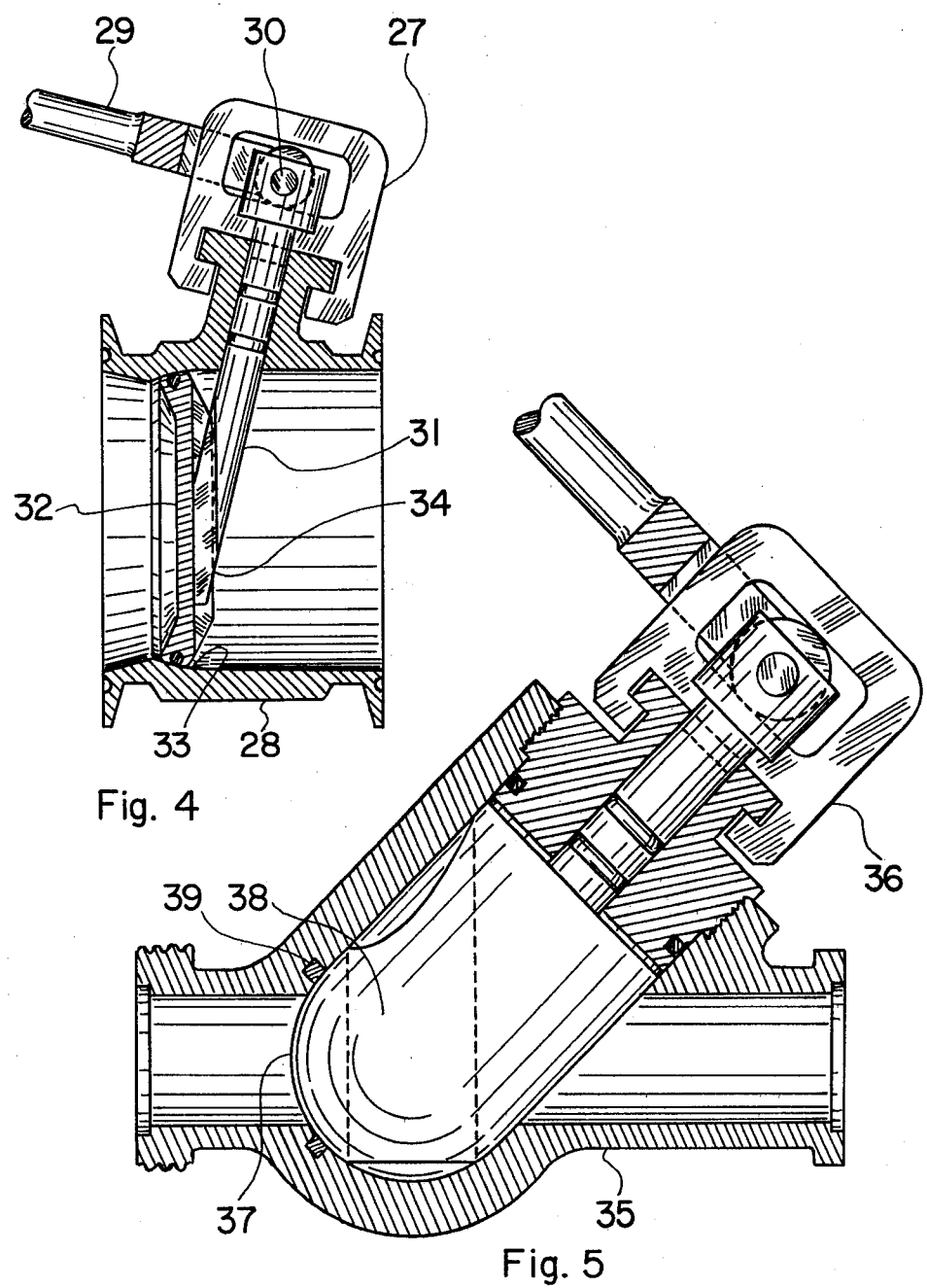
FIG. 4 illustrates the embodiment of the present invention installed in a free-disc butterfly valve.
FIG. 5 illustrates the embodiment of the present invention installed in a free-ball-plug valve.

In FIG. 4, there is shown the device for imposing the linear and angular movement to the valve stem 27, which is described in FIGS. 1, 2 and 3, installed in a free-disc butterfly valve 28, wherein a flip of the handle 29 over 180 degrees about the axis of the pin 30 from the position shown pulls out the valve stem 31 over a small distance, which action, in turn, floats the valve disc 32 away from the spherical valve seat 33 for a frictionless rotation of the valve disc 32 in opening and closing the valve. It should be understood that the inner extremity of the valve stem 31 is slidably connected to the valve disc 32 by means of the dove tail-like sliding joint 34. By flipping the handle 29 back to the position shown after rotating the valve disc 32 to the closed position as shown, the 100 percent closure is obtained as the valve disc 32 is pressed on to the spherical valve seat 33.

In FIG. 5 there is shown a cross section of a ball plug valve 35 equiped with the device for imposing the linear and angular movement to the valve stem 36 described in conjunction with FIGS. 1, 2 and 3, which combination operates in the same principle as that of the free-disc butterfly valve shown in FIG. 4, wherein the hemispherical end 37 of the ball plug 38 is pressed onto the resilient ring seal 39 disposed in the valve body or floated away from the resilient ring seal 39 when the handle is flipped over 180 degrees about the axis perpendicular to the central axis of the valve stem. It should be mentioned that the resilient ring seal 39 can be installed in the ball plug instead of the valve body.

While the principles of the present invention have now been made clear by the illustrative embodiments, there will be immediately obvious to the skilled in the art many modifications in the structures, elements, proportions, arrangement and materials which are particularly adapted to the specific working environment and operating condition in the practice of the invention without departing from the principles of the present invention.

I claim:

1. The device for imposing the linear and angular movement to the rotatable elongated member comprising in combination:
   (a) a stationary housing rotatably supporting said rotatable elongated member;
   (b) a slitted-opening disposed at one extremity of said rotatable elongated member wherein the center plane of said slitted-opening is substantially parallel to the axis of the rotation of said rotatable elongated member which axis of rotation coincides with the central axis of said rotatable elongated member;
   (c) a yoke having a window slidably engaging said slitted-opening, said yoke rotatably secured to said stationary housing;
   (d) a cam roller rotatably disposed in said slitted-opening and rotatably confined in said window included in said yoke, said cam roller eccentrically engaged by a pin disposed across said slitted-opening and anchored by said rotatable elongated member at said one extremity; and
   (e) a handle rigidly connected to said cam roller, said handle pivotable about the axis of said pin and further pivotable about the axis of rotation of said rotatable elongated member; whereby, a pivoting movement of said handle about the axis of said pin in one direction imposes a linear movement to said rotatable elongated member in the first direction parallel to the axis of rotation of said rotatable elongated member and another pivoting movement of said handle about the axis of said pin in the other direction imposes another linear movement to said rotatable elongated member in the second direction opposite to said first direction; and the pivoting movements of said handle about the axis of rotation of said elongated member imposes the rotating movements on said rotatable elongated member about the axis of rotation of said rotatable elongated member.

* * * * *